United States Patent [19]

Hughes

[11] Patent Number: 4,987,376
[45] Date of Patent: Jan. 22, 1991

[54] FREQUENCY SHIFTED LASER TRANSMITTER

[75] Inventor: John L. Hughes, Melbourne, Australia

[73] Assignee: Australian Electro Optics Pty Ltd., Australia

[21] Appl. No.: 274,320

[22] Filed: Nov. 18, 1988

[51] Int. Cl.$^5$ .................. H01S 3/30; H01S 3/081; H01S 3/045
[52] U.S. Cl. ................................... 330/4.3; 372/22; 307/427
[58] Field of Search .............. 330/4.3; 307/426, 427; 372/3, 22, 34, 40, 93, 108

[56] References Cited

U.S. PATENT DOCUMENTS

| | | | |
|---|---|---|---|
| 3,582,820 | 6/1971 | Smtzer | 372/93 |
| 4,058,774 | 11/1977 | Hughes | 330/4.3 |
| 4,061,921 | 12/1977 | Cantrell et al. | 307/426 |
| 4,074,203 | 2/1978 | Hughes | 330/4.3 |
| 4,677,639 | 6/1987 | Lasser | 372/93 |
| 4,751,714 | 6/1988 | Cher | 372/3 |
| 4,809,291 | 2/1989 | Byer et al. | 372/22 |

FOREIGN PATENT DOCUMENTS

| | | | |
|---|---|---|---|
| 87/04870 | 8/1987 | World Int. Prop. O. | 372/40 |
| 87/07449 | 12/1987 | World Int. Prop. O. | 372/3 |

OTHER PUBLICATIONS

Jones, W. B., "The Slab Geometry Laser", Laser Focus, vol. 19, #9, pp. 106–114, 9/83.
Summers et al., "High Average Power ... Laboratory", SPIE, High Power and Solid State Lasers, vol. 622, pp. 2–9, 1/24/86, abst. provided.

*Primary Examiner*—Nelson Moskowitz

[57] ABSTRACT

A compact, powerful, single slab laser oscillator-amplifier system immersed in a high pressure gas which acts as a Raman shifting medium to shift the oscillator output wavelengths from the 1060–3000 nm range to the 1100–14000 nm range. The Raman shifting gas is conained within the casing (29) which also encloses a laser oscillator defined along the long axis of the slab laser medium (1) between dielectric mirror (2) and partially reflecting mirror (3). An electro-optic switch (7) is provided and slab (1) is pumped via a pump light source (22) while being cooled by Peltier stack (26). The slab also includes dielectric mirror (12) and anti-reflection coating (13) which act in conjunction with the slab laser medium (1) and the mirrored substrate (10) to form the amplifier portion of the system. Light passed from the oscillator through prism (4) is reflected by bevelled portion (9) of mirror (10) and directed to slab (1) where it is amplified and reflected by mirror (12). During successive reflections between slab (1) and mirror (10) a Raman shifted beam is generated and is emitted via collimator (19).

10 Claims, 1 Drawing Sheet

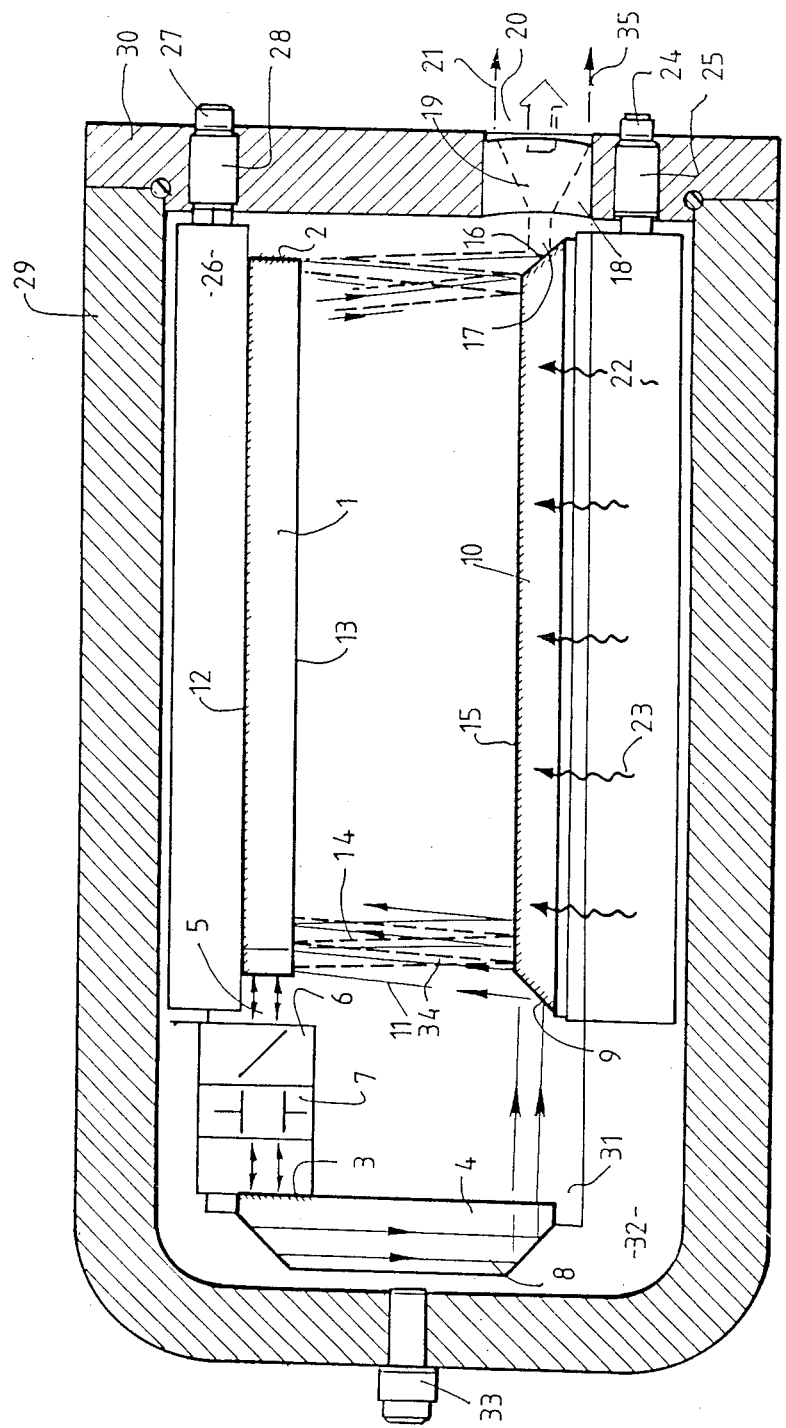

FREQUENCY SHIFTED LASER TRANSMITTER

FIELD OF THE INVENTION

This invention relates to a pulsed, single slab, laser ranging and target designation system whose output wavelengths can be tuned, via the Raman effect in a high pressure gas, in which said slab laser system is immersed, into selected portions of the thermal emission range of the electro-magnetic spectrum extending from 2,000 nanometers to 14,000 nanometers, a thermal emission range passively emitted by a wide range of military targets such as aircraft, missiles, tanks, ships and personnel carriers.

SUMMARY OF THE PRIOR ART

Prior art laser ranging and target designation systems used, for example, in advanced military aircraft, have a serious defect in that under adverse weather conditions, the pilot can see the thermal image of the target but finds that the laser ranging and target designator system operating at much shorter wavelengths in the near infra-red cannot penetrate to and from said targets so that its precise parameters cannot be determined, effectively disabling the aircraft's weapons system. What appeared to be an ideal solution was to replace the near infra-red laser beam generators, for example neodymium doped yttrium-aluminium-garnet (Nd:YAG) crystal lasers of the ranging/target designation system, with laser transmitters operating in the mid infra-red region of the electro-magnetic spectrum, the chosen laser being the carbon dioxide laser emitting at 10,600 nanometers. Unfortunately, carbon dioxide lasers are not renowned for their compactness and ability to generate laser pulses of short duration and high peak powers of the type required for optimum target ranging and designation and have proved difficult to be produced in the compact format of the prior art Nd:YAG rod laser systems.

This invention overcomes the defects of prior art solid state laser ranging/target designation systems under adverse weather conditions by combining the best aspects of both solid state and gaseous lasers into a very compact format which is ideally suited for the confined space mounting under operating conditions experienced in the military fields of activity. The invention solves the wavelength mismatch problem discussed above by converting (via the Raman effect), a portion of a shorter wavelength laser output pulse into a longer wavelength output pulse in the target thermal emission range, under fully controllable conditions, using a single slab laser oscillator-amplifier system immersed in a high pressure gas, the said single slab laser being of the external cavity configuration described in a co-pending patent application. The folded amplification path of the slab laser amplifier operated in the external cavity configuration, allows for a compact, folded path Raman frequency shifter when said slab laser is totally immersed in an appropriate gas at high pressure.

BACKGROUND OF THE INVENTION

The origin of this invention may be traced back to a 1963 proposal (J. L. Hughes, "Nature", May 1963) that experiments involving the focussing of intense laser beams could have a role to play in particle-antiparticle physics. To try and achieve such a goal it was necessary to increase laser peak powers substantially over those available in 1963 and three types of segmented solid state laser media were identified, namely:

(a) laser media segmented in a direction parallel to the direction of propagation of the laser beam;

(b) laser media segmented in a direction perpendicular to the direction of propagation of the laser beam;

(c) a mixture of types (a) and (b).

Lasers of type (a) are known as Phased Array lasers and were studied and abandoned in 1963 by the inventor at the Royal Radar Establishment, Malvern, UK only to be revived in 1979 (Hughes and Ghatah, "Applied Optics", July 1979) and detailed in U.S. patents currently classified.

Lasers of type (b) are known as slab lasers and were first proposed by the inventor in "Applied Optics" in August 1967 in the "Exponential Amplifier" configuration. However, subsequent patents (U.S. Pat. Nos. 4,039,962 and 4,132,955) describe the more practical format of the "Folded Exponential Amplifier" of which further development has led to the external cavity slab lasers of co-pending patents and the current application, the common laser development program being "Laser Radar" or more specifically "Variable Beamwidth Laser Radar" originally proposed by the inventor in 1963 and currently in classified patent formats in the United States Patent Office. From our early 1963-1964 field trials of Laser Radar, on Salisbury Plains, UK (Royal Radar Establishment Technical Memo, "Ruby Laser Field Trials", Hughes and Preece, July 1966) it was clear that visible and near infra-red laser wavelengths would not be suitable for target designation and ranging under adverse weather conditions and it would be essential to operate at longer wavelengths to overcome the scattering and absorption problems. The present invention utilizes a single slab of laser medium which duplicates as both a pulse generating medium and a pulse amplifying medium in an external cavity slab configuration as described in co-pending patent applications.. By immersing the single slab oscillator-amplifier systems in a Raman shifting gas under pressure the invention's configuration automatically realises a folded path Raman shifter where a normal 100 cms path is reduced effectively to one of 10 cms. Using an Erbium doped yttrium aluminium garnet crystalline slab the fundamental wavelength emitted is 2,936 nanometers which can then be shifted via the Raman effect to the 10,000 nanometer region.

The invention has a wide range of applications other than target designation and ranging. This wider application range arises because if the invention incorporating a slab of neodymium doped yttrium aluminium garnet is used to generate a pulse at 1,064 nanometers, this can be shifted into the 1,100 to 1,500 nanometer wavelength range then frequency doubled or tripled into the visible portion of the electromagnetic spectrum. For example, if we Raman shift the Nd:YAG output of 1,064 nanometers to 1,280 nanometers then frequency double to 630 nanometers we have a source of laser light suitable for cancer radiation therapy. If we shift 1,064 nanometers to 1,154 nanometers and double to 577 nanometers, we have a very useful wavelength for the removal of birthmarks. On the other hand if we shift the 1,064 nanometers of Nd:YAG to 1,600 nanometers double to 800 nanometers and double again to 400 nanometers we have an effective operating wavelength in the deep blue. Alternatively, we could shift to 1,200 nanometers and triple the frequency to 400 nanometers. The number of combinations is very large.

BRIEF DESCRIPTION OF THE DRAWING

A better understanding of the invention will be gained from the following description taken in conjunction with the accompanying drawing. It is emphasised that the ensuing teachings are exemplary and not limitative of the scope and applicability of the invention.

In FIG. 1 a schematic layout of the invention is shown. A single rectangular slab, or slab like container, of a laser medium is optically polished on its two opposite large faces, one of which is dielectric layer coated to reflect 100% of the laser wavelength whilst the other is anti-reflection coated to minimise reflections. The two smallest end faces of said slab are also optically polished with one end having a 100% dielectric layered coating at the lasing wavelength deposited on only its central portion in the form of an elliptical distribution, the long axis of said distribution being along the width of said slab whilst the minor axis is along the thickness of said slab, as much as possible of the area of said end face being covered by said reflective coating. The other of the smallest end faces, opposite to the face with the dielectric mirror of elliptical cross-section is coated for minimum reflection with standard laser oscillator switching components being positioned along the long axis of said slab, the last optical element being an elliptical dielectric mirror deposited on a suitable substrate so as to complete the laser oscillator cavity, both said elliptical reflectors defining the ends of said cavity with the last mirror being partially transmitting to allow for the extraction of the switched output of said laser oscillator which is in the form of a laser beam of elliptical cross-section. This output laser beam from the said laser oscillator section of the invention is then turned through 180 degrees and directed at the bevelled edge of a mirrored substrate placed parallel or slightly non-parallel to the mirrored upper surface of the slab so that said laser beam is in turn reflected into the said slab, reflected out again via the said mirrored upper surface onto the mirrored upper surface of said bevelled substrate and back into the slab once more for as many times as the length of said slab and bevelled, mirrored substrate permits. For example, with a laser input beam of elliptical cross-section with major and minor axes of 20 millimeters and 5 millimeters respectively, it is possible to obtain 20 passes in the said folded beam path between the slab and the bevelled mirrored substrate. If the slab and bevelled mirrored substrate are separated by 10 centimeters, then a folded path of 200 centimeters within the open cavity amplifier section of the invention results. If the said invention is immersed in a Raman shifting gas at the appropriate pressure, then a Raman cell path length of 200 cms results providing a very compact layout.

To optically excite the slab of the invention with the highest efficiency and minimal distortion, one has to utilize a bandwidth of optical excitation light which matches the bandwidth of the absorption bands of the lasing ion, which in the case of the rare earth ions are very narrow. It follows that one must either use the narrow band optical light outputs of semi-conductor light sources or the narrow bands of optical radiation that can be produced via the filtering of flashtube outputs. Since the former technique of producing narrow band optical excitation light is far more efficient than the latter by a ratio of 25:1, there is little choice when it comes to the optimum excitation technique. However, since the power output of flashtubes currently far exceeds that of semiconductor light sources, filtered flashtubes would normally be used due to cost factors alone. On the other hand when we are considering the use of the invention as a military target designator and ranging system in highly expensive vehicles such as advanced aircraft, then the cost factor is not as important as the volume and power output factors and expensive semiconductor light sources win out. These sources would be positioned below the bevelled mirrored substrate, which being of non-active optical material would pass the excitation light with minimal loss into the said slab where it would be reflected off the mirrored back surface effectively doubling its absorption path in the said slab.

To cool the slab in the configuration of the invention used in advanced military vehicles where space rather than cost is the dominant factor, a Peltier cooler as known in the art is positioned as near as possible, preferably in contact with, the mirrored rear surface of the said slab. Operating at 100 pulses per second each of one gigawatt ($10^9$ watts) peak power (one joule per nanosecond ($10^{-9}$ second) the mean power will be 100 watts of optical radiation out of the slab whilst the heat deposited in the slab will be of the same order due to the lasing process. In other words, our Peltier cooler stack would have to remove a maximum of a 100 watts from the invention. This heat removal could be aided by flowing helium gas through a very small gap between the rear surface of the slab and the front surface of the said Peltier cooler. The cooling of the semi-conductor light stack used to excite the said slab involves the removal of about 800 watts of heat which can be achieved with fluid cooling particularly since part of the optical exciter stack can be outside the housing of the invention.

To achieve a frequency shifted output pulse, the solid state laser section of the invention has to be immersed in a Raman shifting gas, such as methane, under pressure.

DETAILED DESCRIPTION

In FIG. 1, numeral 1 indicates a slab laser medium of rectangular configuration measuring, for example, 100 mm × 20 mm × 7.5 mm, with the laser oscillator defined by a dielectric mirror indicated by numeral 2, or elliptical cross-section, which is deposited onto the small, optically polished end face of said slab, whose opposite face is also optically polished but anti-reflection coated at the lasing wavelength, and the partially transmitting dielectric mirror, indicated by numeral 3, deposited on the optically polished input face of the 180 degree laser beam turning prism indicated by numeral 4. Numeral 5 indicates the oscillator laser beam path between 2 and 3. Numeral 6 indicates a polariser prism whilst numeral 7 indicates an electro-optic switch for switching said oscillator defined by 2 and 3. Numeral 8 indicates the laser oscillator output beam of elliptical cross-section as defined by 2 as it traverses the 180 degree beam turning block 4. Numeral 9 indicates the dielectrically layered coated bevelled edge of the mirror substrate, indicated by numeral 10 used to inject and extract the elliptical laser beam into and out of 1. After reflection off the bevelled, optically polished mirror 9, the laser beam to be amplified, indicated by numeral 11 is directed into 1 where it is amplified and reflected off the dielectric layered mirror indicated by numeral 12 which has been deposited on the optically polished rear face of slab 1, the opposite front face indicated by numeral 13 being also optically polished but anti-reflection coated to minimise losses. Numeral 14 indicates the amplified laser beam after it has emerged from 1 via face 13 and directed onto the laser beam reflective mirror indicated by numeral 15, which has been deposited on the top, optically polished face of the optically transparent mirror substrate 10.

Numeral 16 indicates the output beam mirror coupler which is identical to mirror 9 and directs the amplified elliptical cross-section laser beam indicated by numeral 17 onto the concave surface, indicated by numeral 18 so that it is diverged as it traverses the optical window indicated by numeral 19 to be collimated via the convex surface indicated by numeral 20 to emerge from the invention as the collimated output beam indicated by numeral 21.

Numeral 22 indicates an optical light source which emits light output indicated by numeral 23 over a narrow bandwidth matching the absorption bands of laser medium 1. Excitation light indicated by numeral 23 passes through the transparent substrate 10 then through the narrow band dielectric reflector 15 via face 13 into slab 1 where it is absorbed to excite said slab into a lasing condition for both the oscillator and amplifier operation. Dielectric film 12 also reflects the unabsorbed portion of light 23 back into 1 where it is absorbed before what is left over exits 1 via face 13. Numeral 24 indicates the power and coupling leads connecting optical excitation source array 22 to its power supply and cooling unit via the lead through indicated by numeral 25.

Numeral 26 indicates a cooling unit which is lightly pressed against the mirrored face 12 of slab 1 which keeps said slab 1 at the temperature required for optimum performance. For room temperature operation, the cooling unit can either be gas or water cooled, whilst for sub-zero operating temperature the unit can be cold gas cooled, liquid cooled or Peltier stack cooled. The umbilical supply leads to cooling pack 26 are indicated by numeral 27 and emerge via the seal indicated by numeral 28. Numeral 29 indicates the casing used to enclose the invention whilst numeral 30 indicates the end plate onto which the invention is attached via the mounting frame indicated by numeral 31.

Numeral 32 indicates the high pressure, pure gas in which the invention is immersed and numeral 33 indicates the aperture in 29 through which said gas 32 can be injected to the required pressure or extracted so that it can be replaced with another gas medium under high pressure of seven hundred pounds per square inch.

Numeral 34 indicates a frequency shifted laser beam being generated via a coherent scattering of the primary laser beam, undergoing amplification in slab 1, by the high pressure gas medium between 1 and 10. To obtain exact superposition of both primary and coherently scattered laser beams as they undergo successive reflections between slab 1 and mirror 10 it is necessary for both beams to be reflected off the said mirrors 12 and 15. However, if the shifted wavelength is poorly transmitted by 1 then a suitable reflector of the shifted wavelength has to be deposited on face 13 of the slab and also on the bottom face of mirror substrate 10 to allow for the minimisation of the off-setted reflections of the respective laser beams. Under optimum operating conditions, beam 34 will emerge as a powerful beam, indicated by numeral 35, which is frequency shifted relative to the fundamental beam 21.

The invention provides a very compact laser beam generator, amplifier and frequency shifter, all in one unit whose actual dimensions are as shown in FIG. 1. The spacing between the slab 1 and the mirror 10 of the invention allows for a minimum of $30 \times 3$, or 90 cms of beam path for the conversion of fundamental laser wavelength into the coherently shifted wavelength output. For example, coherent stokes scattering can produce a $\times 3$ or $\times 4$ shift in wavelength of the fundamental lasing wavelength. In the case of middle infra-red target ranging and designation, the fundamental lasing wavelength has to be generated as far as possible into the near infra-red region of the electro-magnetic spectrum. In this respect, there exists several rare earth elements such as Erbium, Holmium and Dysprosium which emit between 1,500 nanometers and 3,000 nanometers allowing for frequency shifting into the wavelength range from 2,000 nanometers to 14,000 nanometers. To select particular wavelengths, one has to select a suitable gas for the Raman shifter and tune the reflectivity of the mirrors on 10 and 1 at the required wavelength so as to only enhance these selected outputs. Suitable gases for the Raman shifter include hydrogen and methane. To provide greater flexibility, the fundamental pump wavelengths for the Raman shifter can be shortened if the mirror base 10 can be made of non*linear crystals such as Type II deuterated potassium phosphate. In this way, the primary beam can be converted into its harmonics which in turn are Raman shifted to the required wavelength. Alternately, a frequency doubling crystal can be inserted into the shifted output beam. In these two ways, the invention can be used to generate a wide range of output wavelengths from 200 nanometers to 14,000 nanometers that can be used for both military and non-military applications including those in the medical, industrial and research and development fields.

Modifications may be made within the above described subject matter without departing from the spirit and scope of the invention.

I claim:
1. A compact, single slab, laser oscillator-amplifier system, immersed in a high pressure container, comprising:
   (a) a slab of laser gain medium with two face pairs of optically polished surfaces, one of the face pairs being perpendicular to the longest axis of said slab and of the smaller surface area corresponding to the width of said slab multiplied by its thickness, the other surface pair being of the larger surface area corresponding to the length of said slab multiplied by its width, one of each of the surface pairs being dielectric layer coated to reflect 100% of the incident laser light, a mirror on the smaller surface being of elliptical cross-section, both other surfaces being antireflection coated to minimize laser beam reflection losses at the fundamental frequency with one face of each of said pairs of optically polished surfaces being mirrored to reflect said fundamental frequency generated within said slab laser medium;
   (b) an optically transparent, bevelled mirror substrate, dielectric layer coated to reflect a laser beam of elliptical cross-section into said slab mirrored in such a manner as to maintain successive reflections of a primary and frequency shifted laser beam into and off the rear and front surfaces of said slab respectively and also bevelled to extract the frequency shifted laser beam from said system;
   (c) optical means to define and switch a laser oscillator along the long axis of said slab and optical means of turning said laser oscillator output beam through 180 degrees so that it can be directed into the amplifier section of said system;
(d) cooled optical excitation source to excite said laser slab via the bevelled mirror substrate so that a narrow band excitation radiation matching the absorption bands of said laser gain medium is also reflected off the mirrored upper surface of said slab thus increasing its absorption path in said slab laser medium;
(e) cooling means positioned against the upper, mirrored surface of said slab; and,
(f) a high pressure gas enclosure in which said slab laser oscillator-amplifier system is immersed so as to provide a gaseous medium for the shifting of the generated fundamental laser frequency by factors of between 3 and 4 further into the middle infra-red from the range 1,000 nanometers to 2,900 nanometers.

2. A system as claimed in claim 1 where the slab laser medium is neodymium doped yttrium aluminum garnet immersed in methane gas.

3. A system as claimed in claim 1 where the slab laser medium is Erbium doped yttrium aluminum garnet immersed in methane gas.

4. A system as claimed in claim 1 where the fundamental laser wavelength is shifted into the range 1,100 to 1,600 nanometers and frequency doubled into the visible region of the electro-magnetic spectrum.

5. A system as claimed in claim 1 where the output wavelength is 10,000 nanometers.

6. A compact laser oscillator-amplifier system, comprising:
a rectangular slab having a solid state gain medium, optically excited using outputs of narrow optical bandwidth excitation sources which match absorption bands of said laser slab laser medium, which is immersed in a laser beam frequency shifting gas under a high pressure within a container, said slab having two pairs of optically polished surfaces with one face in each of said pairs of faces being mirrored to reflect a fundamental laser beam frequency generated in said laser oscillator-amplifier system, wherein one of the face pairs is perpendicular to the longer axis of said slab and of the smaller surface area corresponding to the width of said slab multiplied by its thickness, the other face pair being of the large surface area corresponding to the length of said slab multiplied by its width, one of each of said face pairs being dielectric layer coated to reflect 100% of the incident laser light, the mirror on the smaller surface being of elliptical cross-section, both other surfaces being anti-reflection coated to minimize laser beam reflection losses at the fundamental frequency generated with said slab laser medium;
an optically transparent, bevelled mirror substrate, dielectric layer coated to reflect a laser beam of elliptical cross-section into said slab mirrored in order to maintain successive reflections of the fundamental frequency and its frequency shifted laser beams into and off of rear and front surfaces of said slab respectively and also bevelled to extract the frequency shifted laser beam from said system;
optical means to define and switch a laser oscillator along a long axis of said slab and optical means of turning said laser oscillator output beam through 180 degrees so that it can be directed into the amplifier section of said system;
a cooled optical excitation source to excite said laser slab via the bevelled mirror substrate so that the narrow band excitation radiation matching the absorption band of said laser gain medium is also reflected off of the mirrored upper surface of said slab thus increasing its absorption path in said slab laser medium;
cooling means in the form of a Peltier cooling stack positioned against the upper, mirrored surface of said slab; and,
a high pressure gas enclosure in which said slab laser oscillator-amplifier system is immersed so as to provide a gaseous medium for the shifting of the generated fundamental laser frequency by factors of between 3 and 4 further into the middle infra-red from a range of 1,000 nm to 2,900 nm.

7. A system as claimed in claim 6 wherein the slab laser medium is neodymium doped yttrium aluminum garnet immersed in methane gas.

8. A system as claimed in claim 6 wherein the slab laser medium is Erbium dope yttrium aluminum garnet immersed in methane gas.

9. A system as claimed in claim 6 wherein the fundamental laser wavelength is shifted into the range of 1,100 to 1,600 nanometers and frequency doubled into the visible region of the electro-magnetic spectrum.

10. A system as claimed in claim 6 wherein the output wavelength is 10,000 nanometers.

* * * * *